United States Patent
Liu (10) Patent No.: US 10,042,936 B1
(45) Date of Patent: Aug. 7, 2018

(54) FREQUENCY-BASED CONTENT ANALYSIS

(71) Applicant: Google LLC, Mountain View, CA (US)

(72) Inventor: Yifang Liu, Redwood City, CA (US)

(73) Assignee: Google LLC, Mountain View, CA (US)

(*) Notice: Subject to any disclaimer, the term of this patent is extended or adjusted under 35 U.S.C. 154(b) by 844 days.

(21) Appl. No.: 14/329,168

(22) Filed: Jul. 11, 2014

(51) Int. Cl.
*G06F 17/30* (2006.01)

(52) U.S. Cl.
CPC .. *G06F 17/30867* (2013.01); *G06F 17/30598* (2013.01)

(58) Field of Classification Search
CPC ............ G06F 17/30867; G06F 17/30598
See application file for complete search history.

(56) References Cited

U.S. PATENT DOCUMENTS

| | | | | |
|---|---|---|---|---|
| 8,200,670 B1* | 6/2012 | Flaster | ............... | G06F 17/3071 707/602 |
| 2006/0106767 A1* | 5/2006 | Adcock | ............... | G06F 17/2785 |
| 2007/0208730 A1* | 9/2007 | Agichtein | ......... | G06F 17/30867 |
| 2008/0255935 A1* | 10/2008 | Madhavan | ............ | G06Q 30/02 705/14.64 |
| 2008/0319746 A1* | 12/2008 | Okamoto | .......... | G06F 17/30719 704/245 |
| 2010/0299200 A1* | 11/2010 | Delli Santi | ......... | G06F 17/3087 705/14.49 |
| 2011/0219004 A1* | 9/2011 | Jin | .................... | G06F 17/30684 707/740 |
| 2013/0046772 A1* | 2/2013 | Gu | .................... | G06F 17/30029 707/751 |
| 2016/0140220 A1* | 5/2016 | Chaumartin | ...... | G06F 17/30707 707/740 |

FOREIGN PATENT DOCUMENTS

WO WO 2006053275 A2 * 5/2006 ............. G06Q 30/02

OTHER PUBLICATIONS

Deane et al., "Improving the Efficiency of Online Advertisement Targeting via Artificial Intelligence Analysis of User's Web Surf History," Conference paper, 2009, 8 pages.
(Continued)

*Primary Examiner* — James Trujillo
*Assistant Examiner* — Jessica N Le
(74) *Attorney, Agent, or Firm* — Fish & Richardson P.C.

(57) ABSTRACT

Methods, systems, and apparatus include computer programs encoded on a computer-readable storage medium for determining keywords. A method includes determining keyword(s) from a set of event information. The set can include plural, similar events so as to enable an effective analysis of a group of events as opposed to an analysis of a single discrete event. The set of events can be formed by filtering a corpus of events by a category. The corpus of events can include, for each event, information such as a search query, a web page associated with the query or visited by a user device, a location associated with a user device, or a search result response. Top ranked terms can be determined based on term frequency. Keyword(s) can be determined for each top ranked term. The keyword(s) can be used to select content for delivery to user devices associated with the category.

11 Claims, 5 Drawing Sheets

(56) References Cited

OTHER PUBLICATIONS

Kristyan et al., "Targeted advertising optimization using vector space model for online behavior on news portal computational advertising case study: Harianjogja.com," 2013 Joint International Conference on Rural Information & Communication Technology and Electric-Vehicle Technology (rICT & ICeV-T), Nov. 26-28, 2013, pp. 1-6.

Pandey et al., "Learning to target: what works for behavioral targeting," Proceedings of the 20th ACM international conference on Information and knowledge management, 2011, pp. 1805-1814, abstract only, 1 page.

Yan et al., "How much can Behavioral Targeting Help Online Advertising?" WWW 2009, Apr. 20-24, pp. 261-270.

\* cited by examiner

FREQUENCY-BASED CONTENT ANALYSIS

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

One or more keywords can be determined from event information associated with a set of events. The set ideally includes plural similar events so as to enable an effective analysis of a group of events as opposed to an analysis of any one single discrete event. The set of events can be formed, for example, from filtering a corpus of events such as by a category of interest. The corpus of events can include, for example, for each event in the corpus, event information such as a search query, a web page associated with the query, a web page visited by a user device, a geo location associated with a requesting user device, a user search result response, or other information. The set of events can be evaluated including determining term frequency in the set. Top ranked terms in the set can be identified based on the determined term frequency. One or more keywords can be determined for each of the top ranked terms. The identified keywords can be used, for example, to select content for delivery to user devices associated with the category of interest. In general, one innovative aspect of the subject matter described in this specification can be implemented in methods that include a method for determining keywords. The method comprises: identifying a corpus of events, each event including event information associated with an event associated with a user device; filtering the corpus of events including determining a category of interest and identifying from the corpus of events a plurality of events in the category, the plurality forming a set of events; evaluating the set of events as a whole, including identifying terms that are included in the set of events and determining for each identified term a term frequency in the set of events; identifying top ranked terms in the set based on the determined term frequency of the terms; determining one or more keywords for each of the top ranked terms; and using the determined one or more keywords.

In general, another aspect of the subject matter described in this specification can be implemented in computer program products. A computer program product is tangibly embodied in a computer-readable storage device and comprises instructions. The instructions, when executed by a processor, cause the processor to: identify a corpus of events, each event including event information associated with an event associated with a user device; filter the corpus of events including determining a category of interest and identifying from the corpus of events a plurality of events in the category, the plurality forming a set of events; evaluate the set of events as a whole, including identifying terms that are included in the set of events and determining for each identified term a term frequency in the set of events; identify top ranked terms in the set based on the determined term frequency of the terms; determine one or more keywords for each of the top ranked terms; and use the determined one or more keywords.

In general, another aspect of the subject matter described in this specification can be implemented in systems. A system includes one or more processors and one or more memory elements including instructions. The instructions, when executed, cause the one or more processors to: identify a corpus of events, each event including event information associated with an event associated with a user device; filter the corpus of events including determining a category of interest and identifying from the corpus of events a plurality of events in the category, the plurality forming a set of events; evaluate the set of events as a whole, including identifying terms that are included in the set of events and determining for each identified term a term frequency in the set of events; identify top ranked terms in the set based on the determined term frequency of the terms; determine one or more keywords for each of the top ranked terms; and use the determined one or more keywords.

These and other implementations can each optionally include one or more of the following features. The event information for a given event can include at least of one a search query, a web page associated with a query, a web page accessed by a user device, a geo location associated with a requesting device, or a user search or suggestion result response. The corpus of events can be associated with a single user device. The corpus of events can be associated with plural, different user devices and the category can identify a common trait concerning the plural, different user devices or actions performed on the plural, different user devices. Filtering can include identifying a plurality of categories of events and selecting a category from the plurality of categories. The category can be searches associated with a single user device in a time period, particular types of searches performed on the user device, or other detected interactions associated with the user device. The category can be based on time, location, or type of query. A vector for events in the set can and a vector for one or more candidate keywords can be created. The vector for the set can be compared to the vectors for the candidate keywords to identify the top ranked terms. Creating a vector for the set can include determining term frequency for unique terms in the plurality of events in the set and storing a value for each term in the vector for the set. Creating a vector for the keywords can include determining term frequency for each unique term in a given keyword and storing a value for the term frequency for each term in the vector for a given keyword. Determining one or more keywords for the top ranked terms can include augmenting the vector for the keywords so that a vector includes a value for every term included in the vector for the set, scoring the augmented vectors, and selecting keywords based on the scoring. Scoring can include determining a dot product of the vector for the set and each vector for the keywords. Selecting can be based on a highest score based on the determining. Using the determined one or more keywords can include using the determined keywords to select content for delivery to user devices associated with the category. Using the determined one or more keywords can include including the determined keywords and a relative importance of a given keyword in a user device profile associated with the category, the relative importance indicating a relative importance of the given keyword in determining content for delivery to the user device. The user search or suggestion result response can be an interaction with a content item and the event can include an identification of the content item.

Particular implementations may realize none, one or more of the following advantages. Insights associated with a group of events can be determined. Keywords can be determined from event information associated with a group of events. Event information can be filtered by various category criteria. Content can be served based on keywords determined from event information associated with multiple events.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

One or more keywords can be determined from event information associated with a set of events. The set ideally includes plural similar events so as to enable an effective analysis of a group of events as opposed to an analysis of any one single discrete event. The set of events can be formed, for example, from filtering a corpus of events such as by a category of interest. The corpus of events can include, for example, for each event in the corpus, event information such as a search query, a web page associated with the query, a web page visited by a user device, a geo location associated with a requesting user device, a user search result response, or other information. The set of events can be evaluated including determining term frequency in the set. Top ranked terms in the set can be identified based on the determined term frequency. One or more keywords can be determined for each of the top ranked terms. The identified keywords can be used, for example, to select content for delivery to user devices associated with the category of interest.

For situations in which the systems discussed here collect information about users, or may make use of information about users, the users may be provided with an opportunity to control whether programs or features collect user information (e.g., information about a user's social network, social actions or activities, profession, demographics, a user's preferences, or a user's current location), or to control whether and/or how to receive content from a content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

Figure 1:
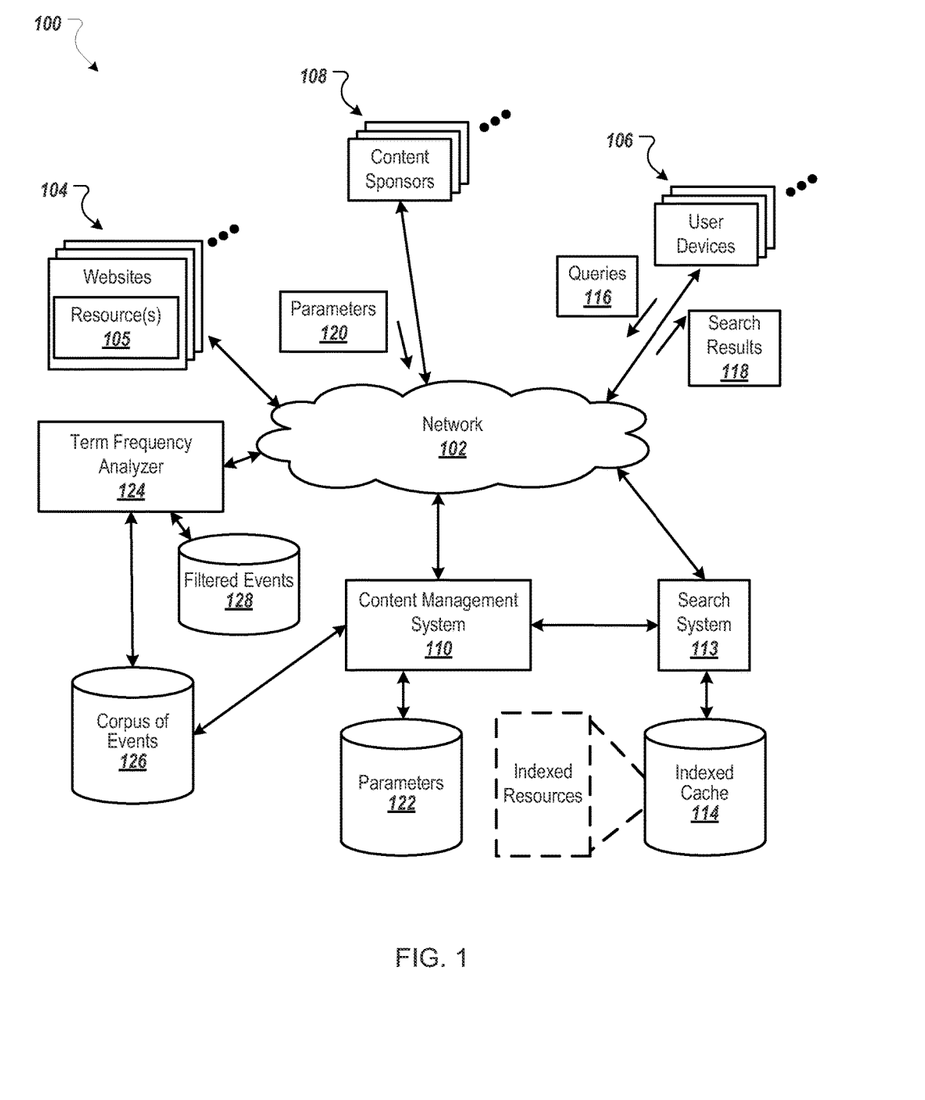
FIG. 1 is a block diagram of an example environment for providing content to a user device.

FIG. 1 is a block diagram of an example environment 100 for providing content to a user device. The example environment 100 includes a network 102, such as a local area network (LAN), a wide area network (WAN), the Internet, or a combination thereof. The network 102 connects websites 104, user devices 106, content sponsors 108, publishers, a content management system 110, and a search system 113. The example environment 100 may include many thousands of websites 104, user devices 106, and content sponsors 108. The content management system 110 may be used for selecting and providing content in response to requests for content. The content sponsors 108 can be, for example, advertisers. Other types of content sponsors are possible.

A content sponsor 108 or content sponsor can create a content campaign associated with one or more content items using tools provided by the content management system 110. For example, the content management system 110 can provide one or more account management user interfaces for creating and managing content campaigns. The account management user interfaces can be made available to the content sponsor 108, for example, either through an online interface provided by the content management system 110 or as an account management software application installed and executed locally at a content sponsor's client device.

A content sponsor 108 can, using the account management user interfaces, provide campaign parameters 120 which define a content campaign. The content campaign can be created and activated for the content sponsor 108 according to the parameters 120 specified by the content sponsor 108. The campaign parameters 120 can be stored in a parameters data store 122. Campaign parameters 120 can include, for example, a campaign name, a preferred content network for placing content, a budget for the campaign, start and end dates for the campaign, a schedule for content placements, content (e.g., creatives), bids, and selection criteria. Selection criteria can include, for example, a language, one or more geographical locations or websites, and one or more selection terms.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, applications, and news feed sources, to name only a few. The resources 105 can include content, such as words, phrases, videos, images and sounds, that may include embedded information (such as meta-information hyperlinks) and/or embedded instructions (such as scripts). A content sponsor 108 can act as a content publisher and can be associated with a website 104, and with one or more resources 105 (e.g., web pages, applications, other resources).

A user device 106 is an electronic device that is under control of a user and is capable of requesting and receiving resources 105 over the network 102. Example user devices 106 include personal computers, tablet computers, mobile communication devices (e.g., smartphones), televisions, set top boxes, personal digital assistants and other devices that can send and receive data over the network 102. A user device 106 typically includes one or more user applications, such as a web browser, to facilitate the sending and receiving of data over the network 102. The web browser can interact with various types of web applications, such as a game, a map application, or an e-mail application, to name a few examples.

A user device 106 can request resources 105 from a website 104. In turn, data representing the resource 105 can be provided to the user device 106 for presentation by the user device 106. User devices 106 can also submit search queries 116 to the search system 113 over the network 102. In response to a search query 116, the search system 113 can, for example, access an indexed cache 114 to identify resources 105 that are relevant to the search query 116. The search system 113 identifies the resources 105 in the form of search results 118 and returns the search results 118 to the user devices 106 in search results pages. A search result 118 is data generated by the search system 113 that identifies a resource 105 that is responsive to a particular search query 116, and can include a link to the resource 105. An example search result 118 can include a web page title, a snippet of text or a portion of an image extracted from the web page, and the URL (Unified Resource Location) of the web page.

The data representing the resource 105 or the search results 118 can also include data specifying a portion of the resource 105 or search results 118 or a portion of a user display (e.g., a presentation location of a pop-up window or in a slot of a web page) in which other content (e.g., advertisements) can be presented. These specified portions of the resource or user display are referred to as slots or impressions. An example slot is an advertisement slot.

When a resource 105 or search results 118 are requested by a user device 106, the content management system 110 may receive a request for content to be provided with the resource 105 or search results 118. The request for content can include characteristics of one or more slots or impressions that are defined for the requested resource 105 or search results 118. For example, a reference (e.g., URL) to the resource 105 or search results 118 for which the slot is defined, a size of the slot, and/or media types that are available for presentation in the slot can be provided to the content management system 110. Similarly, keywords associated with a requested resource 105 or a search query 116 for which search results 118 are requested can also be provided to the content management system 110 to facilitate identification of content that is relevant to the resource 105 or search query 116. An identifier (e.g., cookie) associated with the user device 106 can be received with the request for content.

Based, for example, on data included in the request for content, the content management system 110 can select content items that are eligible to be provided in response to the request. One or more selected content items can be provided to the user device 106 in association with providing an associated resource 105 or search results 118. The provided content item(s) can be presented on the user device 106, in one or more respective slots.

In some implementations, the content management system 110 can select content items based at least in part on results of an auction. For example, content sponsors 108 can provide bids specifying amounts that the content sponsors 108 are respectively willing to pay for presentation of their content items. In turn, an auction can be performed and the slots can be allocated to content sponsors 108 according, among other things, to their bids and/or the relevance of a content item to content presented on a page hosting the slot or a request that is received for the content item. For example, when a slot is being allocated in an auction, the slot can be allocated to the content sponsor 108 that provided the highest bid or a highest auction score (e.g., a score that is computed as a function of a bid and/or a quality measure). When multiple slots are allocated in a single auction, the slots can be allocated to a set of bidders that provided the highest bids or have the highest auction scores.

The content management system 110 can select content items based on keywords determined from term frequency analysis performed against a corpus of events. For example, a term frequency analyzer 124 can analyze event information included in a corpus of events datastore 126. The corpus of events datastore 126 can include, for example, for each stored event, event information such as a search query, a web page associated with the query, a web page visited by a user device, a geo location associated with a requesting user device, a user search result response, or other information. The content management system 110 (and/or another system), can maintain and update the event information in the corpus of events datastore 126, for example.

The term frequency analyzer 124 can filter the corpus of events datastore 126, such as by a category of interest. The category of interest can be based on time, location, or type of event, to name a few examples. The category of interest can be specified for a particular user device or for a group of user devices. The filtering of the corpus of events can produce a set of a plurality of events (e.g., filtered events 128). One or more keywords can be determined from event information associated with the filtered events 128. The term frequency analyzer can evaluate the filtered events 128 to determine term frequency in the filtered events 128. The term frequency analyzer 128 can identify top ranked terms in the filtered events based on the determined term frequency and can determine one or more keywords for each of the top ranked terms.

The parameters 122 (and/or another datastore) can be updated, for example, to associate each of the one or more keywords to the category of interest. The identified keywords can be used, for example, by the content management system 110 to select content for delivery to users associated with the category of interest. For example, a request for content that is associated with the category of interest can be received from a user device 106 and the keywords for the category can be used to select specific content for delivery responsive to the received request. Other uses of the keywords that are generated are possible, such as in suggestions to content sponsors for use in a campaign.

Selecting keywords or performing other analysis of event information stored in the corpus of events datastore 126 can be more effective, for example, than analyzing single discrete events. For example, analysis of information in the corpus of events datastore 126 can provide a broader (e.g., more "global") view than analyzing single events. Analyzing multiple events can result in better understanding of behavior associated with user devices and/or content patterns as compared to analyzing single events.

Figure 2:
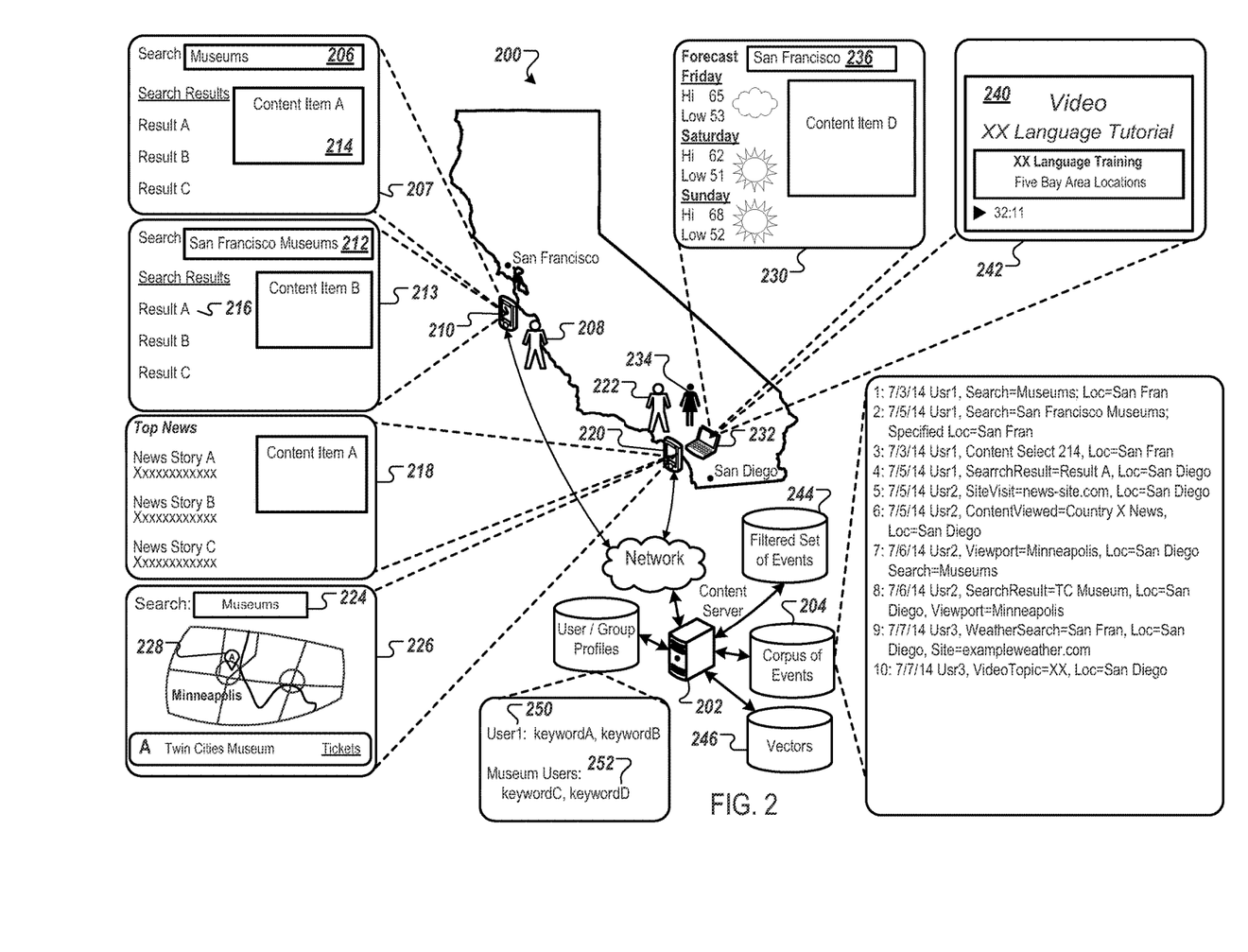
FIG. 2 is a block diagram of an example system for providing content to a user device.

FIG. 2 is a block diagram of an example system 200 for providing content to a user device. A content server 202 can maintain a corpus of events 204. The corpus of events 204 can include information associated with a variety of events that are associated with plural, different user devices. For example, the corpus of events 204 can include information related to past searches (or other queries) performed on a plurality of user devices. For instance, a first entry (e.g., entry "1") in the corpus of events 204 is associated with a search query 206 submitted using a search page 207 by a user 208 using a user device 210. The first entry includes, for example, a timestamp, an identifier of the user 208 (or the user device 210), the search query 206, a location of the user device 210 when the query 206 was submitted, and possibly other information. In some implementations, information identifying the search page 207 is included in the first entry. A second entry in the corpus of events 204 includes information associated with a search query 212 submitted by the user 208 (or another user) using a search page 213 presented on the user device 210. The second entry includes, for example, a timestamp, an identifier of the user 208 (or the user device 210), the search query 212, a location of the user device 210, and a location (e.g., San Francisco) included in the search query 212. Other event information can be stored in the corpus of events 204 for search queries. For example, an event entry can include entity information for one or more entities associated with a search query.

As another example, the corpus of events 204 can include information related to interactions performed on user devices, such as with presented content items, search results, or other presented information. For example, a third entry in the corpus of events 204 includes information associated with selection by the user 208 of a content item 214 included in the search page 207. The third entry includes, among possibly other information, a timestamp, an identifier of the user 208/user device 210, a location of the user device 210, and an identifier of the selected content item 214. In some implementations, information identifying a landing page associated with the content item 214 is stored in the third entry.

A fourth entry in the corpus of events 204 includes information associated with selection by the user 208 of a search result 216 included in the search page 213. The fourth entry includes, among possibly other information, a timestamp, an identifier of the user 208/user device 210, a location of the user device 210, and information that identifies the selected search result 216. In some implementations, information that identifies a destination page associated with the search result 216 is stored in the fourth entry. Information for other types of interaction events can be stored in the corpus of events 204. For example, the corpus of events 204 can include information associated with conversion events.

The corpus of events 204 can include entries that are associated with user device accessing of particular resources (e.g., web sites). For example, a fifth entry in the corpus of events 204 includes information associated with a viewing of a news web site 218 on a user device 220 by a user 222. The fifth entry includes, among possibly other information, a timestamp, information (e.g., a URL) identifying the web site 218, and a location (e.g., San Diego) of the user device 220 when the web site 218 was visited. In some implementations, an entry, such as a sixth entry, can include information that identifies one or more types of content (e.g., country "X" news) associated with a visited web site. The corpus of events 204 can include other information associated with use of a resource, such as use of an application on a given user device.

The corpus of events 204 can include information associated with a map search and/or interactions with map search results. For example, a seventh entry in the corpus of events 204 includes information associated with a map search query 224 submitted by the user 222 on a map search page 226 using the user device 220. The seventh entry includes, among possibly other information, a timestamp, the map search query 224, a location presented in the map search page 226 (e.g., Minneapolis) and a location of the user device 220 (e.g., San Diego). An eighth entry included in the corpus of events 204 includes information associated with selection by the user 222 of a map search result 228. The eighth entry includes, among possibly other information, a timestamp, an identifier of the user device 220/user 222, an identifier of the search result 228, a viewport location presented in the map search page 226 (e.g., Minneapolis) and a location of the user device 220 (e.g., San Diego).

The corpus of events 204 can include information associated with other types of events. For example, a ninth entry includes information associated with presentation of a weather page 230 presented on a user device 232 of a user 234 and a weather search query 236 submitted by the user 234 using the weather page 230. The ninth entry includes, for example, a timestamp, the weather search query 236, an identifier of the user device 232/the user 234, an identifier (e.g., URL) associated with the weather page 230, and a location of the user device 232. A tenth entry in the corpus of events 204 includes information associated with a viewing by the user 234 of a video content item 240 on a video player page 242 on the user device 232. The tenth entry can include, for example, a timestamp, an identifier of the user device 232/the user 234, an identifier of the video content item 240, one or more topics (e.g., XX programming) associated with the video content item 240, and a location of the user device 232.

The content server 202 can determine one or more keywords for a particular category of interest based on information included in the corpus of events 204. The content server 202 can, for example, filter the corpus of events 204 by identifying from the corpus of events a plurality of events that are in or otherwise associated with the category. The filtered events can form a set of events 244. The category can be based on time, location, user device, type of user or type of query, to name a few examples. When the corpus of events is associated with plural, different user devices, the category can identify a common trait concerning the plural, different user devices or actions performed on the plural, different user devices. When the corpus of events is associated with a single user device, the category can be searches associated with the single user device in a time period, particular types of searches performed on the user device, locations associated with the user device, actions performed on the user device, or other detected interactions associated with the user device.

Filtering the corpus of events 204 by a category can result in the inclusion of a variety of subsets of entries from the corpus of events 204 in the set of events 244. For example, for a category of "events performed in San Francisco", the set of events 244 can include the entries one, two, and three. For a category of "events associated with San Francisco", the set of events 244 can include the entries one, two, three, and nine. The set of events 244 can include the entries one, two, three, and eight for a category of "events associated with a topic of museums". The entries one, two, three, and four can be included in the set of events 244 for a category of "events related to recent searches by the user 'Usr1'". The entries one through ten can be included in the set of events 244 for a category of "events occurring during the first week of July, 2014". The entries one through ten can be included in the set of events 244 for a category of "events occurring in California".

Other types of filtering can be performed. For example, the corpus of events 204 can be filtered to produce a set of events for search queries of a particular type (e.g., weather queries, auto repair, etc.). As another example, the set of events can include events associated with a particular user device session. As yet another example, the set of events can include events associated with user devices that are associated with a particular user list, such as a user list that is associated with a particular category of user devices.

The content server 202 can evaluate the set of events 244 to determine term frequency of terms that are included in a given event. The content server 202 can aggregate the term frequency over all of the events in the set of events 244 to determine term frequency in the set of events 244. Term frequency in the set can be represented, for example, as a first vector that is stored, for example, in a vectors datastore 246. The first vector can be created and can include, for example, an entry for each unique term associated with the set of events 244. The entry for a term can include a frequency count of occurrences of the term in the set of events 244. The content server 204 can identify top ranked terms in the set of events 244 based on the determined term frequency of the terms.

Figure 3:
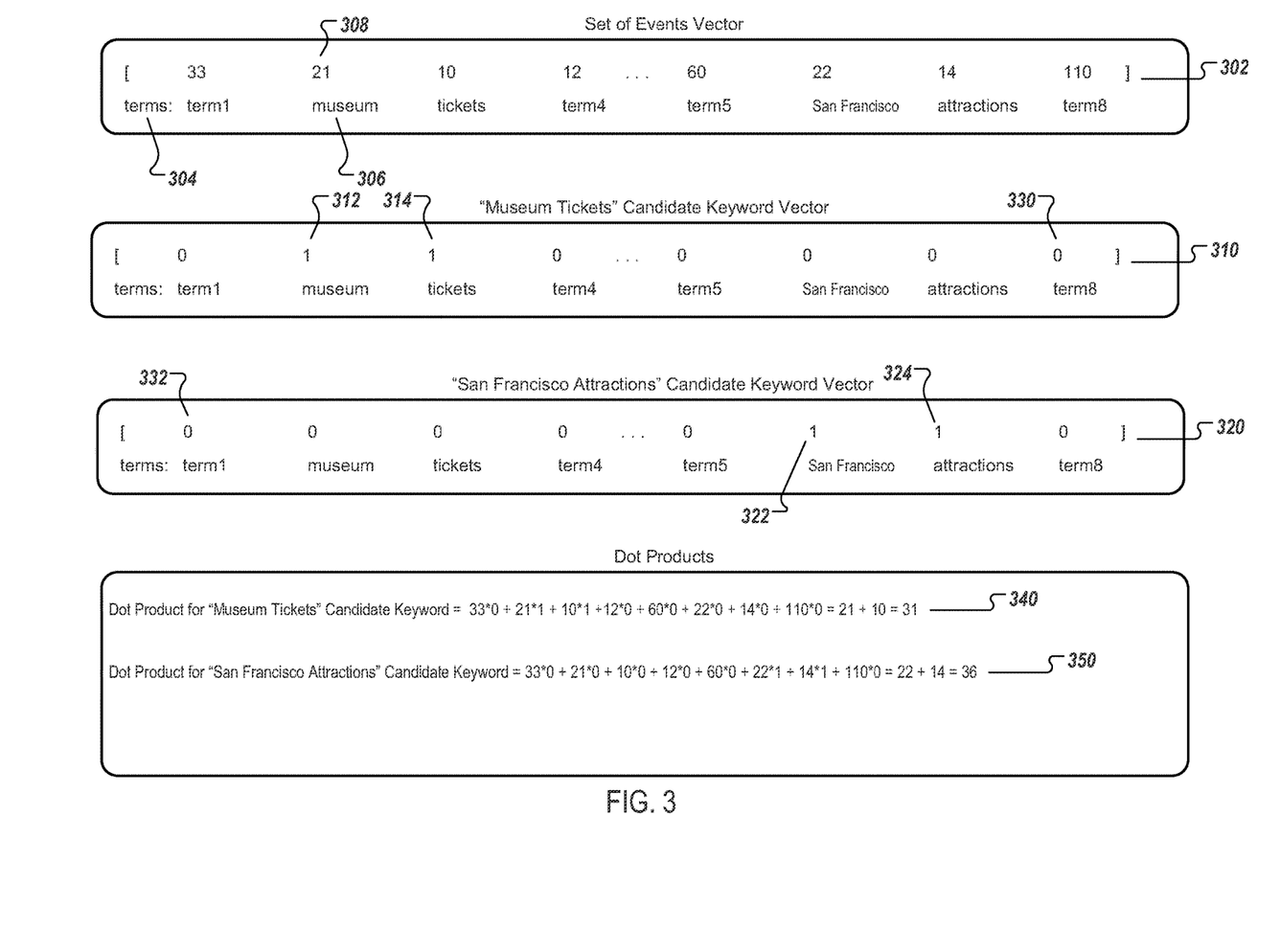
FIG. 3 illustrates example vectors.

For example and as shown in FIG. 3, a vector 302 for a set of events includes a series of frequency counts (e.g., 33, 21, 10, 12, . . . , 60, 22, 14, 110). Each frequency count is associated with a particular term that is associated with the set of events. For purposes of illustration, respective term labels 304 are displayed underneath respective frequency counts. For example, a term label 306 of "museum" indicates that a frequency count 308 of "21" is associated with the term "museum".

As mentioned above, top ranked terms in the set of events can be identified based on the determined term frequency of terms associated with the set of events. For example, a vector for each of one or more candidate keywords can be created. Candidate keywords can be determined, for example, based on terms included in the vector 302. For example, based on the terms included in the vector 302, candidate keywords which equal, include, or are included by a term can be identified. For example, a vector 310 associated with a candidate keyword of "museum tickets" can be created. A term frequency for each unique term in a given candidate keyword can be determined. For example, a frequency value of one for each unique term included in the candidate keyword can be included in the vector 310. For example, a frequency value 312 of one is included in the vector 310 for a "museum" term and a frequency value 314 of one is included in the vector 310 for a "tickets" term. A vector 320 for a "San Francisco attractions" candidate keyword includes a frequency value 322 of one for a "San Francisco" term and a frequency value 324 of one for an "attractions" term.

The vectors 310 and 320 can be augmented so that both the vector 310 and the vector 320 include a value for every term included in the vector 302 for events in the set. For example, an entry can be added to the vector 310 and to the vector 320 for each term that is included in the vector 302 (e.g., with a value of zero for the entry). For example, an entry 330 in the vector 310 and an entry 332 in the vector 320 can be included in a respective vector as a result of augmentation. In general, the vectors 310 and 320 can augmented so that the vectors 302, 310, and 320 include the same number of entries and a given entry in one vector corresponds to a same term as a corresponding entry (e.g., an entry at a same position) in the other vector.

The vectors 310 and 320 can each be compared to the vector 302. For example, a comparison score for each of the vectors 310 and 320 can be determined. For example, a dot product can be determined between the vector 310 and the vector 302, and between the vector 320 and the vector 302. As another example, a comparison score can be based on another measure, such as cosine similarity. A dot product result 340 illustrates a dot product calculation performed for the vector 310 and the vector 302. A dot product result 350 illustrates a dot product calculation performed for the vector 320 and the vector 302. In this example, the candidate keyword "San Francisco attractions" that is associated with the vector 320 has a higher comparison score (e.g., thirty six) than a comparison score (e.g., thirty one) for the candidate keyword "Museum Tickets" that is associated with the vector 310.

In general, when comparison scores are determined for a plurality of candidate keywords, the candidate keywords that have top-ranked comparison scores can be determined. For example, candidate keywords with the top N (e.g., ten) highest comparison scores can be identified. As another example, candidate keywords with comparison scores higher than a threshold can be identified.

Referring again to FIG. 2, determined top-ranked candidate keywords can be associated with the category of interest that is associated with the filtered set of events 244. For example, the top-ranked candidate keywords can be identified as selected keywords for the category of interest. For example, when the category of interest is associated with a single user (e.g., the user 208), the selected keywords can be included in or be otherwise associated with a user/user device profile associated with the user 208 (e.g., as illustrated in a user profile entry 250). The user 208 can, for example, view information in the user profile entry 250. When the category of interest is associated with plural, different users, the selected keywords can be associated with a group profile that is associated with the category (e.g., such as a group profile 252).

The selected keywords can be used to select content for delivery to users in the category. For example, when the category is "recent searches by the user 208", the keywords that have been identified for that category can be used to select content for a subsequent content request that is received for the user 208.

Figure 4:
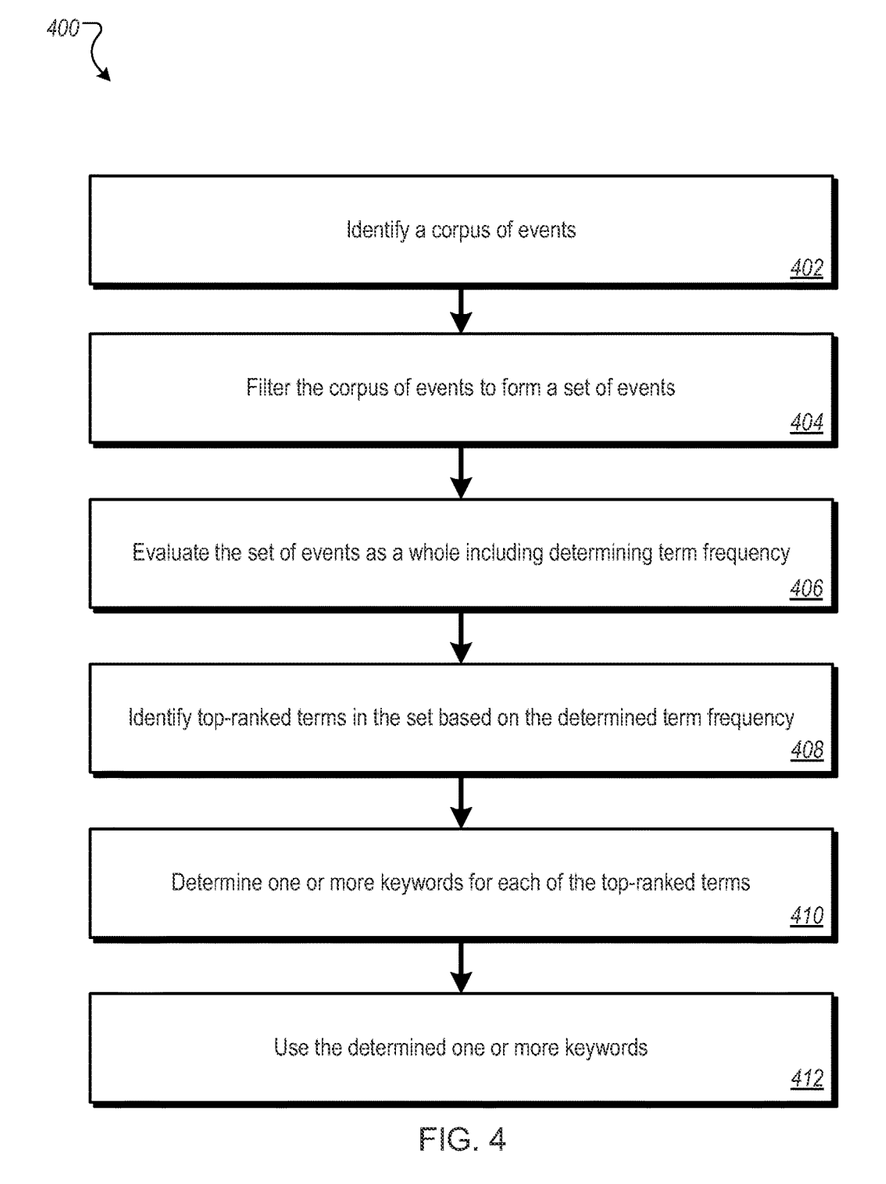
FIG. 4 is a flowchart of an example process for determining keywords.

FIG. 4 is a flowchart of an example process 400 for determining keywords. The process 400 can be performed, for example, by the content management system 110 described above with respect to FIG. 1 or the content server 202 described above with respect to FIG. 2.

A corpus of plural events is identified (402), each event including information associated with a given event including a search query, a web page associated with the query, a web page accessed by a user device, a geo location associated with a requesting device, and a user search or suggestion result response. The corpus of events can include other types of events. The corpus of events can be associated with a single user device or with plural, different user devices.

The corpus of events is filtered (404), including determining a category of interest and identifying from the corpus of events a plurality of events in the category, the plurality forming a set of events. A category can be selected, for example, from an identified plurality of categories. The category can be based on time, location, or type of query, to name a few examples. When the corpus of events is associated with plural, different user devices, the category can identify a common trait concerning the plural, different user devices or actions performed on the plural, different user devices. When the corpus of events is associated with a single user device, the category can be searches associated with the single user device in a time period, particular types of searches performed on the user device, or other detected interactions associated with the user device.

The set of events is evaluated as a whole (406), including identifying terms that are included in the set of events and determining for each identified term a term frequency in the set of events. Term frequency in the set can be represented, for example, as a vector. A vector for events in the set can be created and can include, for example, an entry for each unique term associated with the set of events. The entry for a term can include a frequency count of occurrences of the term in the set of events.

Top ranked terms in the set are identified based on the determined term frequency of the terms (408). For example, terms with the top N highest term frequencies can be identified. As another example, terms with term frequencies higher than a threshold can be identified.

In some implementations, a vector for each of one or more candidate keywords can be created. A term frequency for each unique term in a given candidate keyword can be determined. For example, a given candidate keyword may be "New York City Hotel". Unique terms in the candidate keyword can be, for example, "New York", "New York City", "City", "Hotel", and "New York City Hotel". A value for the term frequency for each term (e.g., a value of one) can be stored in the vector for the given keyword.

The vector for the set can be compared to the vectors for the candidate keywords to identify the top ranked terms. For example, a vector for a candidate keyword can be augmented so that the vector for the candidate keyword includes a value for every term included in the vector for events in the set. For example, an entry can be added to the vector for the candidate keyword for each term that is included in the vector for events in the set (e.g., with a value of zero for the entry). In some implementations, augmentation of the vector for events in the set is performed when a term is included in a candidate keyword but is not included in the vector for the set of events. For example, an entry associated with the term included in the candidate keyword can be added to the vector for events in the set (e.g., with a value of zero for the entry). In general, the vector for events in the set and/or a vector for a candidate keyword can be augmented so that both vectors include the same number of entries and a given entry in one vector corresponds to a same term as a corresponding entry (e.g., an entry at a same position) in the other vector.

Each of the augmented vectors for a candidate keyword can be scored. For example, a dot product can be determined for each augmented vector for a candidate keyword, between the vector for the set and the respective augmented vector for the candidate keyword. As another example, a cosine similarity score can be determined, for each augmented vector for a candidate keyword, between the vector for the set and the respective augmented vector for the candidate keyword. The top ranked terms can be selected based on the scoring. For example, the top ranked terms associated with a highest dot product score or highest cosine similarity score can be selected.

One or more keywords are determined for each of the top ranked terms (410). For example, some or all of the top ranked terms can be determined to be keywords. As another example, one or more keywords that are related to a top ranked term can be determined to be a keyword. For example, candidate keywords which equal, include, or are included by a top-ranked term can be identified. As another example, candidate keywords that include two or more top-ranked terms can be identified.

The determined one or more keywords are used (412). For example, one or more keywords can be identified and used to select content for delivery to user devices associated with the category. As another example, the determined one or more keywords and a relative importance of a given keyword can be included in a user device profile associated with the category. A relative importance of a given keyword can indicate a relative importance of the keyword in determining content for delivery to the user device.

Figure 5:
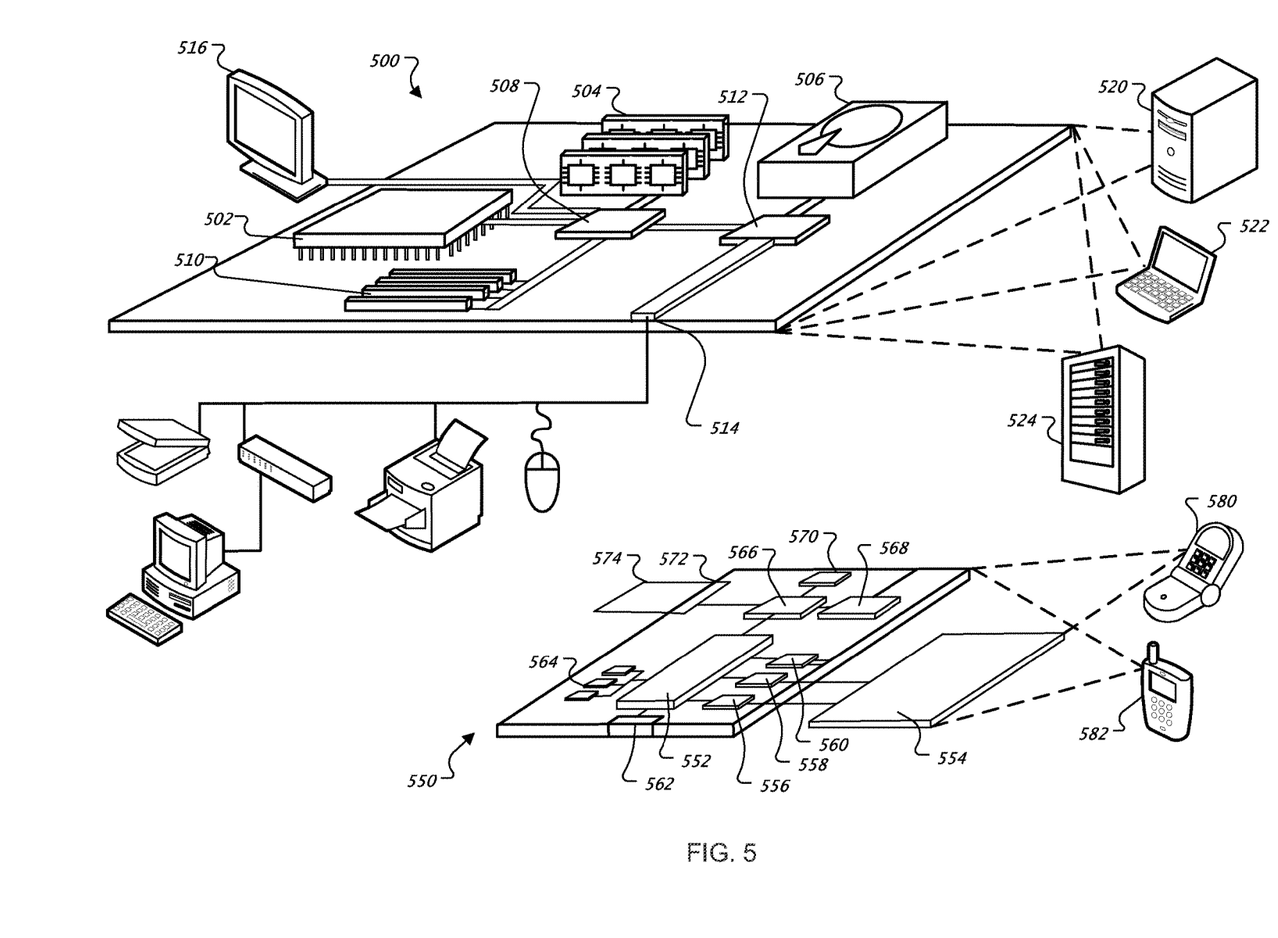
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. The computer-readable medium is not a propagating signal. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is illustrative only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
    identifying, by one or more computers, a corpus of events, each event including event information associated with an event associated with a user device;
    filtering, by the one or more computers, the corpus of events to identify, from among the corpus of events, a set of events, including multiple types of events, performed at a first user device within a single session in a specified time period, wherein the set of events includes multiple queries submitted at the first user device and one or more search results that were selected from respective search results pages presented at the first user device following submission of respective search queries;
    evaluating, by the one or more computers, the set of events as a whole, including:
        identifying, by the one or more computers, a set of terms that are included in the set of events, including:
            for each given event in the set of events, identifying, by the one or more computers, event-related terms that are included in event information included in the given event; and
            adding, by the one or more computers, the event-related terms identified for each event in the set of events to the set of terms that are included in the set of events;
        determining, by the one or more computers, a set of candidate keywords based on the identified terms in the set of terms, each candidate keyword including a different combination of terms from the set of terms identified from the set of events;
        determining, by the one or more computers and for each given candidate keyword in the set of candidate keywords, a term frequency of each term included in the given candidate keyword in the event information for the set of events; and
        determining, by the one or more computers, top ranked candidate keywords in the set of candidate keywords based on the determined term frequency of each of the terms included in each of the given candidate keywords;
    receiving, by the one or more computers, a request for content from the first user device; and
    selecting, by the one or more computers, a first content item using the determined top ranked candidate keywords, the first content item being different than the top ranked keywords.

2. The method of claim 1, wherein the event information for a given event includes at least one of a respective search query, a web resource accessed by the first user device, a geo location at which the first user device was located when submitting the respective search query, a search result selected on the first user device, a destination web page of the selected search result, a user content item selection, a landing page for the selected content item, application information for an application used on the first user device, or a geo location displayed in a map interface on the first user device.

3. The method of claim 1, wherein the filtering is based on time, location, or type of query.

4. The method of claim 1, further comprising creating a vector for events in the set of events, creating a vector for each candidate keyword, and comparing the vector for the set of events to the vectors for the candidate keywords to identify the top ranked candidate keywords.

5. The method of claim 4, wherein creating a vector for the set of events includes determining term frequency for unique terms in the plurality of events in the set of events and storing a value for each term in the vector for the set of events.

6. The method of claim 5, wherein creating a vector for each of the candidate keywords further includes determining term frequency for each unique term in a given candidate keyword and storing a value for the term frequency for each term in the vector for a given candidate keyword.

7. The method of claim 6, wherein determining top ranked candidate keywords includes augmenting the vectors for the candidate keywords so that a given vector for a given candidate keyword includes a value for every term included in the vector, scoring the augmented vectors, and selecting candidate keywords based on the scoring.

8. The method of claim 7, wherein scoring includes determining a dot product of the vector for the set of events and each vector for the candidate keywords and wherein selecting is based on a highest score based on the determining.

9. The method of claim 1, wherein using the determined one or more top ranked candidate keywords comprises including the determined top ranked candidate keywords and a relative importance of a given top ranked candidate keyword in a user device profile associated with the user device, the relative importance indicating a relative importance of the given top ranked candidate keyword in determining content for delivery to the user device.

10. A system comprising:
one or more processors; and
one or more memory elements including instructions that when executed cause the one or more processors to:
identify a corpus of events, each event including event information associated with an event associated with a user device;
filter the corpus of events to identify, from among the corpus of events, a set of events, including multiple types of events, performed at a first user device within a single session in a specified time period, wherein the set of events includes multiple queries submitted at the first user device and one or more search results that were selected from respective search results pages presented at the first user device following submission of respective search queries;
evaluate the set of events as a whole, including:
identifying a set of terms that are included in the set of events, including:
for each given event in the set of events, identifying event-related terms that are included in event information included in the given event; and
adding the event-related terms identified for each event in the set of events to the set of terms that are included in the set of events;
determining a set of candidate keywords based on the identified terms in the set of terms, each candidate keyword including a different combination of terms from the set of terms identified from the set of events;
determining, for each given candidate keyword in the set of candidate keywords, a term frequency of each term included in the given candidate keyword in the event information for the set of events; and
determining top ranked candidate keywords in the set of candidate keywords based on the determined term frequency of each of the terms included in each of the given candidate keywords;
receive a request for content from the first user device; and
select a first content item using the determined top ranked candidate keywords, the first content item being different than the top ranked keywords.

11. A computer program product tangibly embodied in a computer-readable storage device and comprising instructions that, when executed by a processor, cause the processor to:
identify a corpus of events, each event including event information associated with an event associated with a user device;
filter the corpus of events to identify, from among the corpus of events, a set of events, including multiple types of events, performed at a first user device within a single session in a specified time period, wherein the set of events includes multiple queries submitted at the first user device and one or more search results that were selected from respective search results pages presented at the first user device following submission of respective search queries;
evaluate the set of events as a whole, including:
identifying a set of terms that are included in the set of events, including:
for each given event in the set of events, identifying event-related terms that are included in event information included in the given event; and
adding the event-related terms identified for each event in the set of events to the set of terms that are included in the set of events;
determining a set of candidate keywords based on the identified terms in the set of terms, each candidate keyword including a different combination of terms from the set of terms identified from the set of events;
determining, for each given candidate keyword in the set of candidate keywords, a term frequency of each term included in the given candidate keyword in the event information for the set of events; and
determining top ranked candidate keywords in the set of candidate keywords based on the determined term frequency of each of the terms included in each of the given candidate keywords;
receive a request for content from the first user device; and
select a first content item using the determined top ranked candidate keywords, the first content item being different than the top ranked keywords.

* * * * *

UNITED STATES PATENT AND TRADEMARK OFFICE
CERTIFICATE OF CORRECTION

PATENT NO. : 10,042,936 B1
APPLICATION NO. : 14/329168
DATED : August 7, 2018
INVENTOR(S) : Liu Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 880 days.

Signed and Sealed this
Twenty-seventh Day of August, 2019

Andrei Iancu
*Director of the United States Patent and Trademark Office*